US008635051B1

(12) United States Patent
Wu et al.

(10) Patent No.: US 8,635,051 B1
(45) Date of Patent: Jan. 21, 2014

(54) SYSTEM AND METHOD FOR PRESSURE-DEPENDENT DEMAND OPTIMIZATION FOR LEAKAGE DETECTION

(75) Inventors: Zheng Yi Wu, Watertown, CT (US); Paul Sage, Northwich (GB); Thomas M. Walski, Nanticoke, PA (US); Wayne R. Hartell, Golden Grove (AU); Kristopher L. Culin, Bristol, CT (US)

(73) Assignee: Bentley Systems, Incorporated, Exton, PA (US)

( * ) Notice: Subject to any disclaimer, the term of this patent is extended or adjusted under 35 U.S.C. 154(b) by 878 days.

(21) Appl. No.: 12/550,214

(22) Filed: Aug. 28, 2009

Related U.S. Application Data

(60) Provisional application No. 61/092,648, filed on Aug. 28, 2008.

(51) Int. Cl.
 *G06G 7/50* (2006.01)
(52) U.S. Cl.
 USPC .................................................. 703/9
(58) Field of Classification Search
 CPC ................................................. G06F 2217/16
 USPC ............................................................ 703/6, 9
 See application file for complete search history.

(56) References Cited

PUBLICATIONS

Vitkovsky et al., Leak detection and calibration using transients and genetric algorithms, Journal of wather resources planning and management, Jul. 2000, 4 pages.*

Zheng Yi Wu, water loss detection via genetic algorithm optimization based model calibration, annual internatlin symposium on water distrubution system analysis, 8, 27, 2006.*
Almandoz, Javier, et al., "Leakage Assessment Through Water Distribution Network Simulation," Journal of Water Resources Planning and Management, ASCE, Nov./Dec. 2005, pp. 1-9.
Beck, S. B., et al., "Pipeline Network Features and Leak Detection by Cross-Correlation Analysis of Reflected Waves," Journal of Hydraulic Engineering, ASCE, Aug. 2005, pp. 715-723.
Burrows, R., et al., "Introduction of a Fully Dynamic Representation of Leakage into Network Modeling Studies Using Epanet," Advances in Water Supply Management—Maksimovic, Butler & Memon (eds), Swets & Zeitlinger, Lisse, ISBN 9058096084, 2003, pp. 109-118.
Covas, Didia, et al., "Hysraulic Transients Used for Leakage Detection in Water Distribution Systems," BHR Group, Water Pipeline Systems, 2001, pp. 227-241.

(Continued)

*Primary Examiner* — Kamini S Shah
*Assistant Examiner* — Luke Osborne
(74) *Attorney, Agent, or Firm* — Cesari and McKenna, LLP

(57) ABSTRACT

In one embodiment, a hydraulic simulation model corresponding to a real-world hydraulic network is loaded in a hydraulic modeling and simulation application executing on a computer system. The hydraulic simulation model represents leakages as pressure dependent emitter flow at selected nodes (leakage nodes). Optimization criteria include a specified maximum of possible leakage nodes. A genetic algorithm (GA) generates trial solutions for an optimization, each trial solution representing locations for leakage nodes and corresponding emitter coefficients. A hydraulic analysis is performed for the trial solutions to generated model-simulated results. The model-simulated results are compared to field-observed data for the real-world hydraulic network to generate goodness-of-fit values. The process is repeated until a particular goodness-of-fit value is achieved or a maximum number of iterations is reached. Predicted locations for leakage nodes from a particular selected trial solution are then displayed to a user.

17 Claims, 6 Drawing Sheets

(56) References Cited

PUBLICATIONS

Lambert, A. O., et al., "Practical Experience in Using the Infrastructure Leakage Index," International Water Association Conference 'Leakage Management: A Practical Approach' in Lemoesos, Cyprus, Nov. 2002, pp. 1-17.

Lambert, A. O., et al., "Water Losses Management and Techniques," International Report, Water Supply vol. 2 No. 4, IWA Publishing, 2002, pp. 1-21.

Lee, Pedro j., et al., "Leak Detection in Pipelines Using an Inverse Resonance Method," 2002 Conference on Water Resources Planning & Management, ASCE, Virginia, USA ,May 19-22, 2002, pp. 1-10.

Holnicki-Szulc, Jan, et al., "Leakage Detection in Water Networks," Journal of Intelligent Material Systems and Structures, vol. 16, No. 3, 207-219, Sage Publications, 2005, pp. 1-13.

Kapelan, Z., et al., "Incorporation of Prior Information on Parameters in Inverse Transient Analysis for Leak Detection and Roughness Calibration," Urban Water Journal, vol. 1, Issue 2, Jun. 2004, pp. 1-53.

Kim, Sang Hyun, "Extensive Development of Leak Detection Algorithm by Impulse Response Method," Journal of Hydraulic Engineering, ASCE, Mar. 2005, pp. 1-8.

Kunkel, George, et al., "Committee Report: Applying Worldwide BMPs in Water Loss Control," AWWA Water Loss Control Committee, Journal AWWA, 95:8, Aug. 2003, pp. 65-79.

Sage, Paul, "Developments in the Use of Network Models for Leakage Management at United Utilities North West," CIWEM North West and North Wales Branch Water Treatment and Distribution Conference, Warrington, UK, Nov. 2005, pp. 1-31.

Stoianov, Ivan, et al., "Wavelet Processing of Transient Signals for Pipeline Leak Location and Qualification," 2002, pp. 1-10.

Vitkovsky, John P., et al., "Minimization Algorithms and Experimental Inverse Transient Leak Detection," 1st Annual Environmental & Water Resources Systems Analysis Symposium in conjunction with ASCE Environmental & Water Resources Institute Annual Conference, Roanoke, Virginia, USA, May 19-22, 2002, pp. 1-10.

Wu, Z. Y., et al., "Pressure Dependent Demand Optimization for Leakage Detection in Water Distribution Systems," CCWI2007, De Montfort University, UK, Sep. 3-5, 2007, pp. 1-12.

\* cited by examiner ered in that a more limited amount of equipment must be repeat- 65

SYSTEM AND METHOD FOR PRESSURE-DEPENDENT DEMAND OPTIMIZATION FOR LEAKAGE DETECTION

CROSS-REFERENCE TO RELATED APPLICATIONS

The present application claims the benefit of U.S. Provisional Patent Application Ser. No. 61/092,648, which was filed on Aug. 28, 2008, by Wu et al. for a SYSTEM AND METHOD FOR PRESSURE-DEPENDENT DEMAND OPTIMIZATION FOR LEAKAGE DETECTION, and which is incorporated by reference herein in its entirety.

BACKGROUND

1. Technical Field

This disclosure relates to techniques for leakage detection in a hydraulic network and, more specifically, to leakage detection using pressure-dependant demand optimization where leakages are represented as pressure-dependant emitter flows.

2. Background is Water utilities provide clean water to local communities and charge for the service by metering water consumptions or basing charges on the ratable value of customer's properties. However, not all water produced reaches the customers and generates revenue for water companies. Instead, a significant portion of it is lost, due to leakage from water mains and unauthorized water use. Water loss represents a major fraction of non-revenue water (NRW). Some estimate that the annual NRW volume lost is as high as 50 billion cubic meters from a world wide annual production of 300 billion cubic meters of potable water treated. The UK report that, on average, more than 15% of water produced in the UK is lost. Similarly, Canada reports that as much as $1 billion worth of drinking water disappears into the ground every year from leaky municipal water pipes in Ontario, and that 20 to 40 percent of all the water pumped through municipal water systems never reaches consumer taps. The fact that water companies and municipalities are losing such large quantities of water through leaky pipes undermines the conservation messages that many water utilities and municipalities are championing. Further, reduction of these losses also provides opportunities for water companies to reduce their carbon footprint and improve water infrastructure sustainability.

There are several known techniques for detecting where leakages are occurring in a water distribution system. These include (1) random or regular sounding surveys; (2) steptesting of sub-systems and (3) acoustic loggers surveys. Regular or random sounding surveys are time consuming and not always effective in focusing on areas with potential leaks. This is in part due to the fact that leakage technicians may end up looking for leaks in sections of the network where they are not prevalent, only realizing this after the fact. Further, steptesting needs to be conducted branch by branch, and generally must be undertaken during the period of minimum night flow (MNF) (e.g. 1:00 AM to 5:00 AM) is to avoid supply interruptions to the majority of customers. This may render steptesting to be inconvenient and expensive. Acoustic loggers can be either installed across the water distribution system or deployed at certain points. As such, loggers may be expensive in terms of the amount of equipment required or inconvenient edly moved. Further, the effectiveness of acoustic loggers in sensing leaks can also be impaired by planned pressure reductions in operation and/or the replacement of ferrous mains with plastic ones. Both factors limit the amount of noise generated by leaks and subsequently reduce the acoustic logger's capacity to 'hear' the leaks.

Over the last decade, leakage detection has been the focus of a significant amount of research. A variety of techniques, including inverse transient analysis, Bayesian identification method, flow statistical analysis, and belief-rule-based expert system, have been applied to attempt to quantitatively identify leakage. Among the methods, some consider inverse transient modeling to be the most widespread approach. The technique is based on the deliberate generation of transient waves or impulses at one location, and the measurement of the propagated transients with highly sensitive pressure transducers at other locations in the water distribution system. The observed transient pressures are used to identify model parameters including leakage and pipe roughness.

However, the applicability of inverse transient techniques has been limited to the instantaneous small amplitude disturbances within simple reservoir-pipe-valve type configurations or reservoir-pipe-reservoir systems. To date, there are no reports of successful application of inverse transient methods to water mains distribution systems. As these networks are often highly looped and contain many valves, tanks and pumps, any induced transients will become heavily damped. Generally this prevents transient induction from being successfully used for leakage location prediction. In addition to the damping, it is also difficult to distinguish transient wave reflections caused by possible leaks from reflections caused by pipeline fittings and those arising from demand changes. There is also the risk of inducing ingress and contamination into the network from the generated transients.

Hence, there is a need for techniques for predicting likely leakage nodes locations in a hydraulic network (e.g. a water distribution system), which will enable users (e.g. engineers) to identify leaky water mains safely, quickly and cost-effectively.

SUMMARY

In one embodiment, model-based pressure-dependant demand optimization techniques for leakage detection in a hydraulic network (e.g. a water distribution system) are disclosed. In such techniques, leakages may be represented as pressure dependent emitter flow at selected nodes (leakage node) of a hydraulic simulation model in hydraulic modeling and simulation application, where the model corresponds to a real-world hydraulic network (e.g. water distribution system). The emitters emulate physical leak holes that are allowing fluid to flow out of the system. The leakage detection techniques pinpoint likely leakage nodes by optimizing the locations of a user-specified maximum number of leakage nodes and their associated emitter coefficients in the hydraulic simulation model, such that the difference between model-predicted and the field-observed data for pressure and flow are minimized.

Specifically, in one embodiment, a user specifies in a user interface a maximum number of possible leakage nodes for a nodal demand group. An optimization is then performed using a genetic algorithm (GA), for example a fast messy genetic algorithm (fmGA) provided by a model calibration tool, that searches for the best combination of leakage node locations within each demand group. The GA also optimizes the emitter coefficients for a total number of nodes to minimize the difference between model-predicted and the field-observed data for pressure and flow.

Advantageously, the novel leakage detection techniques are not limited to hydraulic networks (e.g. water distribution systems) of a particular size or configuration, such that they may be practically applicable to large water mains distribution systems that are highly looped and contain many valves, tanks and pumps.

BRIEF DESCRIPTION OF THE DRAWINGS

The description of example embodiments below refers to the accompanying drawings, of which.

DETAILED DESCRIPTION

Figure 1:
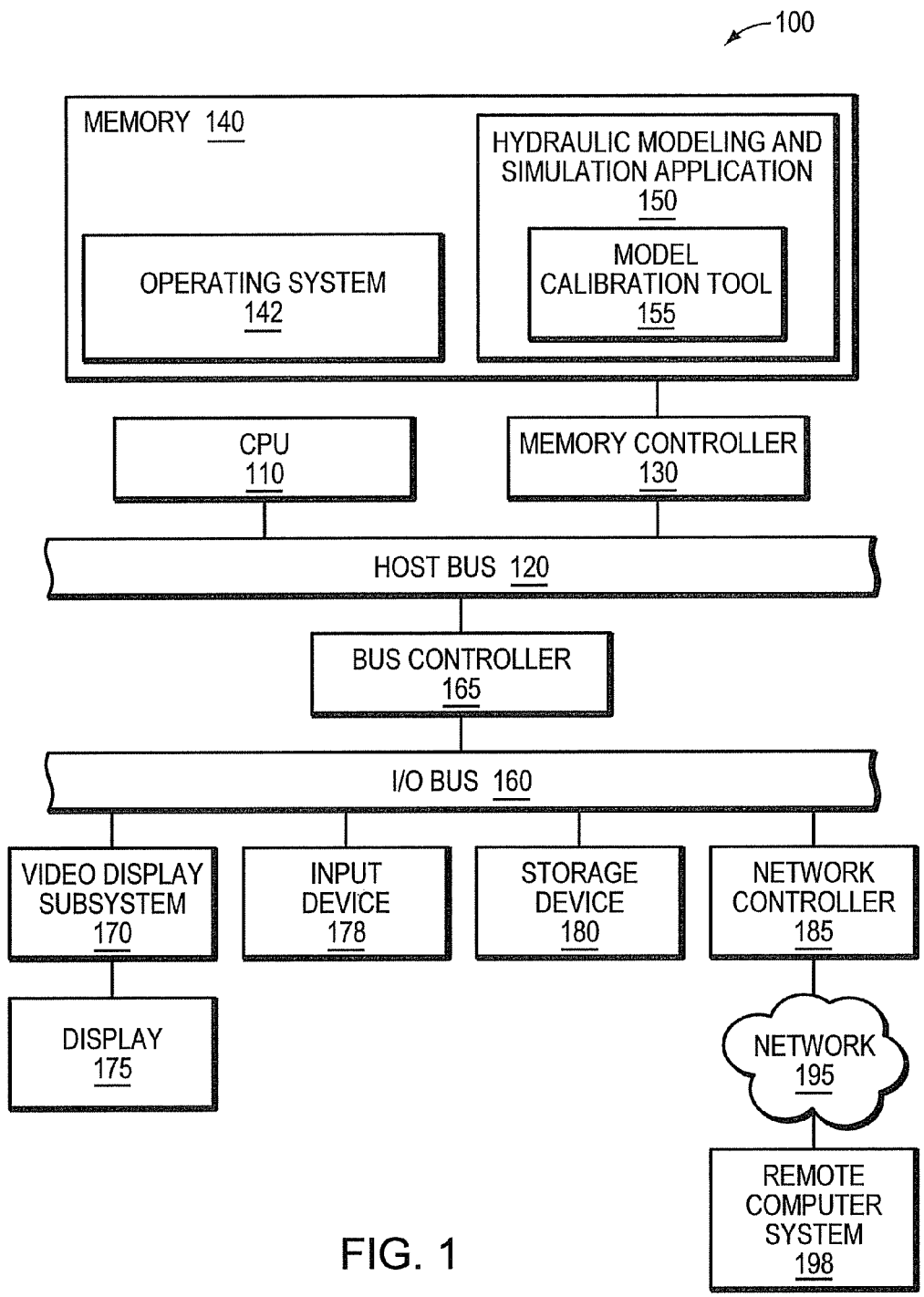
FIG. 1 is a block diagram of an example computer system in which at least some of the leakage detection techniques described herein may be employed.

FIG. 1 is a block diagram of an example computer system 100 in which at least some of the leakage detection techniques described herein may be employed. The computer system 100 includes at least one central processing unit (CPU) 110 coupled to a host bus 120. The CPU 110 may be any of a variety of commercially available processors, such as an Intel x86 processor, an IBM PowerPC processor, a SPARC processor, or another type of processor. A volatile memory 140, such as a Random Access Memory (RAM), is coupled to the host bus 120 via a memory controller 130. The volatile memory 140 is configured to store at least a portion of data, including executable instructions, for an operating system 142 while the computer system 100 is operating. In addition, the volatile memory 140 may store portions of application software, including portions of a hydraulic modeling and simulation application 150 while the computer system 100 is operating.

While the hydraulic modeling and simulation application 150 may be any of a variety of types of fluid conveyance system modeling and/or simulation applications, in the preferred embodiment, it is the WaterCAD® water distribution modeling and management solution available from Bentley Systems, Incorporated of Exton, Pa. The application 150 may be structured to include certain core interfaces and modules (i.e., core functionality), as well as one or more optional "add-on" modules. One such "add-on" module may be a model calibration tool 155, for example the Darwin Calibrator™ tool available from Bentley Systems, Inc of Exton, Pa. Such model calibration tool 155 may accept real-world measurements (i.e. field-observed data), generate a large number of possible solutions (i.e. trial solutions), and then use these solution to optimize/calibrate a hydraulic simulation model, for example, by selecting optimum values. Further detail regarding one example model calibration tool may be found in U.S. Pat. No. 7,457,735, entitled METHOD AND SYSTEM FOR AUTOMATIC WATER DISTRIBUTION MODEL CALIBRATION to Wu et al.

As explained further below, the hydraulic modeling and simulation application 150, in conjunction with the model calibration tool 155, may include executable instructions that when executed by a processor implement novel leakage detection techniques that pinpoint likely leakage node locations using a using pressure-dependant demand optimization.

Looking further to FIG. 1, the host bus 120 of the example computer system 100 is coupled to an input/output (I/O) bus 160, such as a Peripheral Component Interconnect (PCI) bus, through a bus controller 165. A video display subsystem 170, coupled to a is display 175, may be connected to the I/O bus 160. The display 175 may show a user interface of the hydraulic modeling and simulation application 150 and model calibration tool 155. Similarly, one or more input devices 178, such as, a keyboard, a mouse, or a touch pad, may allow a user to interface with the hydraulic modeling and simulation application 150 and model calibration tool 155.

A storage device 180, such as hard disk drive, a compact disk (CD), Digital Video Disc (DVD), or other type of computer-readable storage medium, may be coupled to the I/O bus 160 and persistently store data, including executable instructions. Such persistently stored data may be loaded to the volatile memory 140 when needed. For example, executable instructions related to the operating system 142, the hydraulic modeling and simulation application 150 and/or the model calibration tool 155, may be stored in the storage device 180 until they are needed.

The I/O bus 160 may be further coupled to a network controller 190 that interfaces with a computer network 195. The computer network 195 may allow communication between the computer system 100 and other computer systems, for example, a remote computer system 198, using any of a number of well-known network protocols. Such network communication may allow certain remote, distributed and/or parallel computing configurations, in which some or all of the techniques discussed herein are implemented on different computing platforms.

Figure 2:
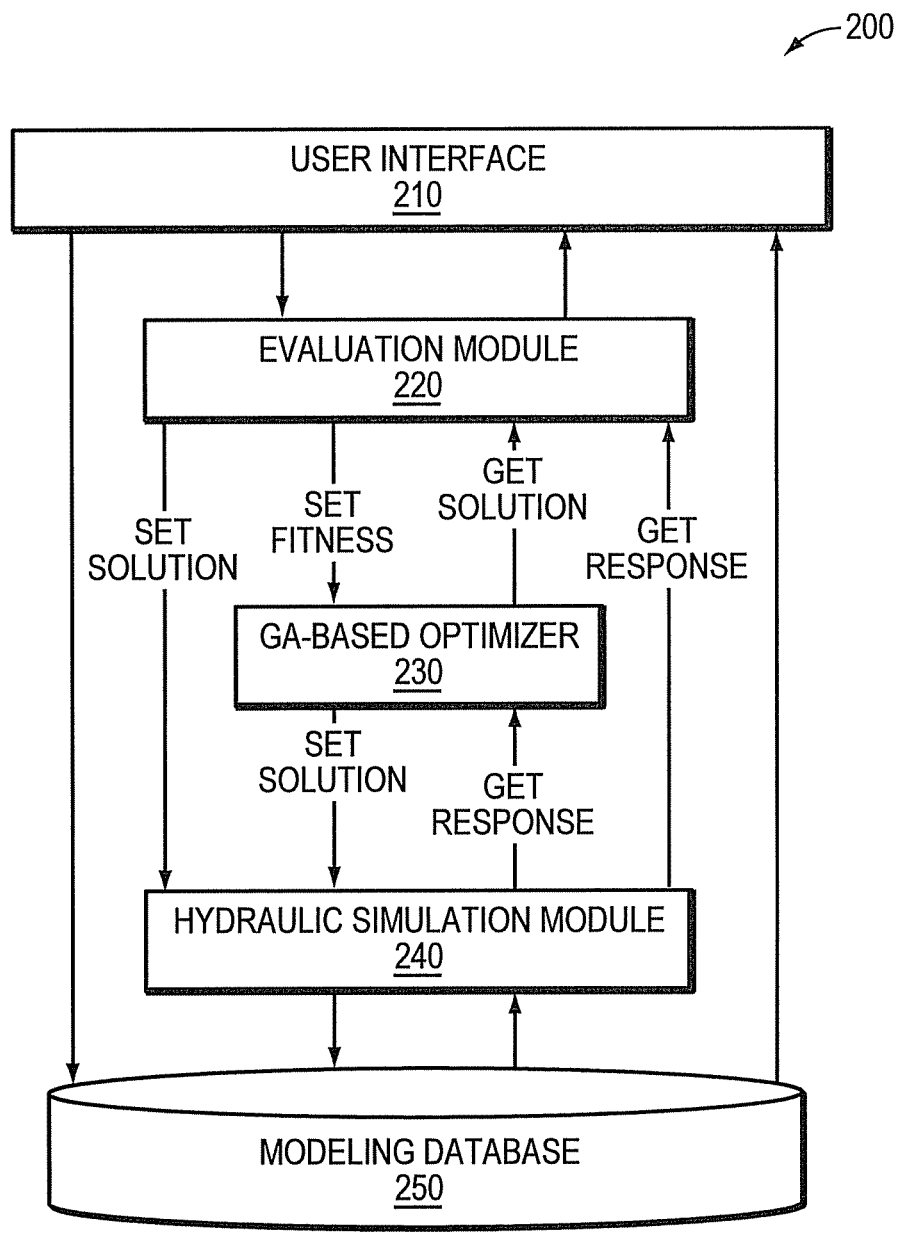
FIG. 2 is a block diagram of an example hydraulic modeling and simulation application with a model calibration tool, that may implement the leakage detection techniques described herein.

FIG. 2 is a block diagram 200 of an example hydraulic modeling and simulation application 150 with a model calibration tool 155 that may implement the leakage detection techniques discussed herein. A user interface 210, for example, a graphical user interface (GUI), may receive input from, and communicate results, to a user (e.g. an engineer). Portions of the user interface 210 may be shown on display 175 of the computer system 100.

A user may interact with the user interface 210 to manually create a hydraulic simulation model 240 of a water distribution system. For example, a user may directly select elements (i.e. representations of objects in a network) including links, such as pipes, and nodes, such as junctions, tanks, and valves, pumps, etc. The user may then place and interconnect these elements in a desired manner to approximate the arrangement of a real-word water distribution system. The user may further assign each element (link or node) appropriate attributes. For example, a pipe may be assigned attributes such as a diameter, a length, and a roughness.

In addition, a user may interact with the user interface 210, to import data from an existing data source to construct the hydraulic simulation model 240. For example, database data, spreadsheet data, and/or geographic information system (GIS) data, may be imported to define some or all elements, element attributes, and their interrelationships.

While the hydraulic simulation model 240 may be graphically represented to a user in the user interface 210, underlying this graphical representation is typically a series of mathematical matrices. Such underlying information may be persistently stored in a modeling database 250, which may be maintained, for example, on the storage device 180 of the computer system 100. The modeling database 250 may further persistently maintain field-observed data for a real-world hydraulic network corresponding to the hydraulic simulation model 240, as well as nodal demands, boundary conditions, optimization criteria, results, and other information, whose use is discussed in more detail further below.

To conduct an optimization, the hydraulic simulation model 240, along with the field-observed data, nodal demands, boundary conditions and optimization criteria entered, may be read from the modeling database 250 and provided to an evaluation module 220. The evaluation module 220 may work in conjunction with a genetic algorithm (GA)-based optimizer 230 that automatically searches for optimal, or near optimal solutions, using a GA, for example a fast messy GA (fmGA). The GA-based optimizer 230 may automatically generate possible solutions (i.e. trial solutions) that are progressively improved during the optimization process. Each trial solution, along with the nodal demands and boundary conditions, is submitted back to the evaluation module 220, which predicts hydraulic responses and generates model-simulated values. As discussed in is more detail below, a goodness-of-fit may be calculated between the field-observed data and these model-simulated values. An optimization run may be terminated when a maximum number of trials are reached, or a predetermined acceptable goodness-of-fit is obtained. Overall results may then be reported back to the user via the user interface 210.

Figure 3:
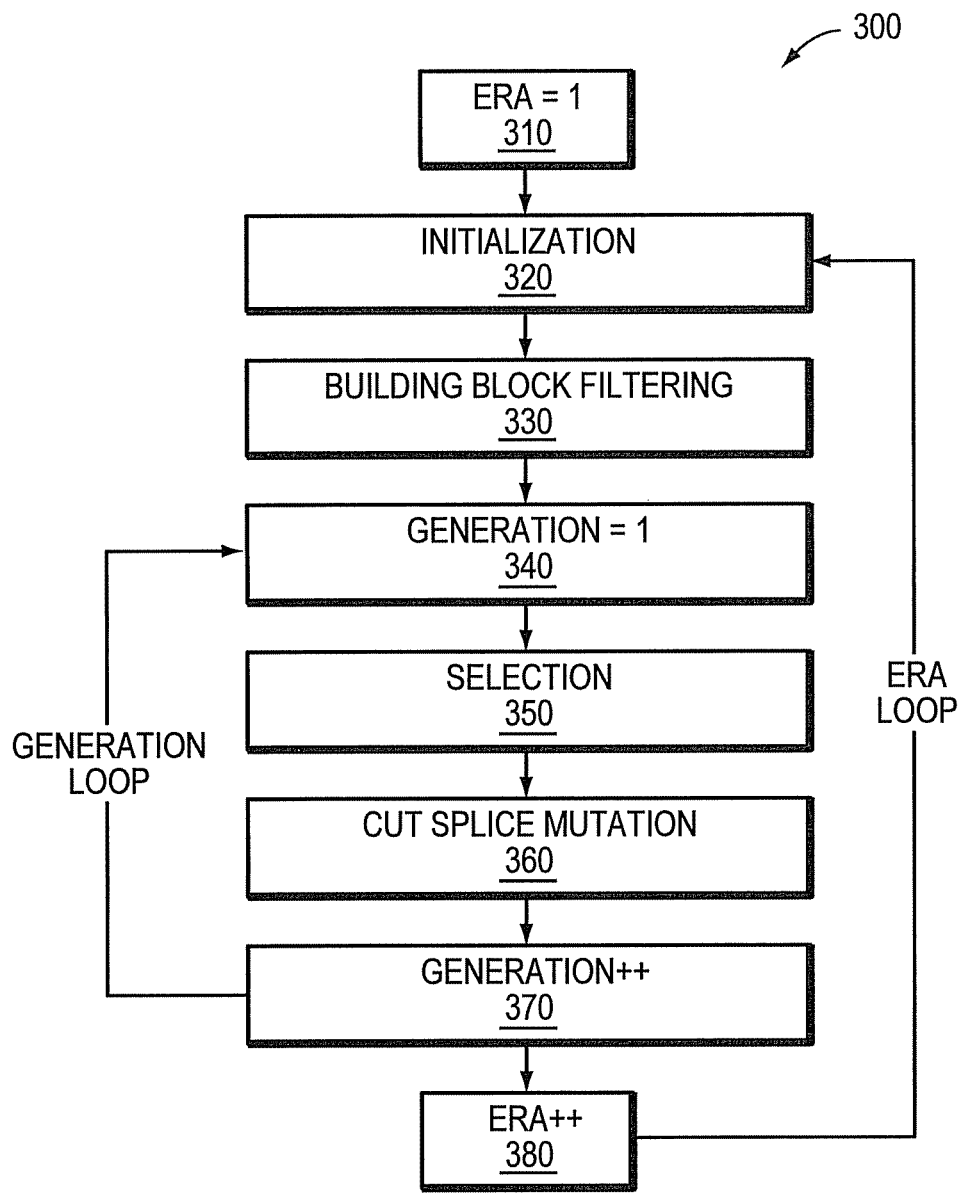
FIG. 3 is a flow diagram of an example generalized fast messy genetic algorithm (fmGA) that may be employed by a genetic algorithm (GA)-based optimizer.

FIG. 3 is a flow diagram 300 of an example generalized fmGA that may be employed by the GA-based optimizer 230. While a standard GA may use a binary string having a fixed length (e.g., a fixed number of bits) to represent trial solutions, an fmGA typically employs a flexible scheme for trial solution representation that uses strings of variable lengths. That is, the strings may vary from in length from one string to another. Short strings (i.e. partial solutions) may be generated and evaluated during an early stage of an fmGA optimization. The short strings with above average goodness-of-fit values may be retained as "building blocks" of good full solutions As illustrated in FIG. 3, in an initial era 310, the fmGA optimization may be initialized with an initial population of full length trial solution (i.e. full length strings), at step 320. This may be followed by a "building block" filtering process, at step 330, that identifies "better" fitting short strings, by randomly deleting portions of the initial full length strings. In an initial generation 340, particular short strings may be selected, at selection step 350. The selected short strings are used to generate new solutions. A solution may be formed, at step 360, by "cut" and "splice" operations (mutations). A "cut" operation divides one string into two strings, while a "splice" operation links two strings to create one individual string. Both operations are designed to effectively exchange "building blocks" for generating good solutions. The "cut" and "splice" operations may proceed over a number of generations, iterated at step 370, and the entire process may proceed over a number of eras, iterated at step 380. The eras may continue until "good" solutions are found, that is, solutions that achieve a predetermined acceptable goodness-of-fit, or a maximum number of iterations is reached.

Leakage Detection

The above described hydraulic modeling and simulation application 150 and/or the model calibration tool 155 may implement novel model-based pressure-dependant is demand optimization techniques for leakage detection in a water distribution system. In such techniques, leakages may be represented as pressure dependent emitter flow at selected nodes (leakage node) of the hydraulic simulation model 240. The emitters emulate physical leak holes that are allowing water to flow out of the water distribution system. The leakage detection techniques pinpoint likely leakage nodes by optimizing the locations of a user-specified maximum number of leakage nodes and their associated emitter coefficients in the hydraulic simulation model 240, such that the difference between model-predicted and the field-observed values for pressure and flow are minimized. This optimization may be solved using a GA, for example, using an adaption of the generalized fmGA employed by the above described GA-based optimizer 230. Advantageously, the novel leakage detection techniques are not limited to water distribution systems of a particular size or configuration, such that they may be practically applicable to large water mains distribution systems that are highly looped and contain many valves, tanks and pumps.

More specifically, in one embodiment, the following algorithms may be employed to implement the leakage detection techniques. Leakage is one type of pressure dependent demand that can be modeled as an emitter flow given as:

$$Q_{i,j}(t) = K_i [P_i(t)]^\alpha \quad (1)$$

where $Q_{i,j}(t)$ is the leakage aggregated at node i at time t, $P_i(t)$ is the nodal pressure at node i at time t, $K_i$ is the emitter coefficient at node I, and $\alpha$ is the exponent that can be flexibly set to any desired value. Although the exponent may vary from 0.5 to 2.5 due to different pipeline materials, the exponent is preferably set to be close to 0.5. Eq. (1) indicates that a positive emitter coefficient will result in leakage demand at a node. Therefore, the emitter coefficient $K_i$ may be optimized as an indication of possible leakage. When its optimal value is greater than zero at a node, that node is referred to as a "leakage node," i.e. a node that has pipes connected to it that include leaks.

In order to identify leakage nodes, an optimization is employed to optimize the node emitter coefficients. In a typical all-mains hydraulic simulation model of a realis world water distribution system, this could entail optimization of hundreds or even thousands of emitter coefficients if all possible demand nodes were included. To avoid a problem with thousands of decision variables, the present techniques preferably make use of the assumption that sizable and restorable leaks are typically associated with no more than a few dozens of leakage nodes.

In general, a water distribution system may be divided into different sub-systems, each of which may represent similar pipeline conditions and water consumption characteristics. The nodes within a sub-system may be aggregated into one demand group. Thus, all the nodes in a large water distribution system may be aggregated into a number of demand groups. Each demand group may be specified to have a given maximum number of leakage nodes, at which the emitter coefficients fall within prescribed limits. The actual number of leakage nodes is in a demand group determined by the optimized node indices where the emitter coefficients are found to be greater-than-zero. In addition, any nodes with negative pressures in a demand group are not selected as leakage nodes, because the flow emitters at such nodes indicate inflows into the system, instead of leakage out of the system. Such a leakage detection problem may be generalized as:

Search for:

$$\vec{X} = (LN_i^n, K_i^n); LN_i^n \in J^n; n = 1, \ldots, NGroup, i = 1, \ldots, NLeak^n \quad (2)$$

Minimize:

$$F(\vec{X}) \quad (3)$$

Subject to:

$$0 \leq K_i^n \leq \overline{K^n} \quad (4)$$

$$P_i^n > 0 \quad (5)$$

$$\sum_{n=1}^{NGroup} NL_{dup}^n = 0 \quad (6)$$

Where $LN_i^n$ is the leakage node index for leakage node i within demand group n, $K_i^n$ is the emitter coefficient for leakage node i in group n, $J^n$ is the set of nodes within group n, NGroup is the number of node groups, $NLeak^n$ is the number of user-specified leakage nodes to be identified for node group n, $\overline{K^n}$ is the maximum emitter coefficient for group n, $P_i^n$ is the pressure head at the detected leakage node i within group n, $NL_{dup}^n$ is the number of the duplicated nodes that are identified as leakage emitters in one solution for group n, and $$F(\vec{X})$$

is an objective function that evaluates goodness-of-fit.

The objective function, $$F(\vec{X}),$$

defines the discrepancy between the model-simulated and the field-observed junctions' Hydraulic Gradient Lines, (HGLs) and pipe flows. In order to equivalently consider both HGL and flow contribution to the dimensionless fitness, a goodness-of-fit value may be calculated by using two user-specified conversion factors, namely a hydraulic head per fitness point and a pipe flow per fitness point, which convert the head difference and flow difference into a dimensionless goodness-of-fit value. A variety of different functions may be employed that have different objectives, including the following three functions defined as:

1. Objective type I: minimize the sum of difference squares $$F(\vec{X}) = \sum_{t=1}^{T} \frac{\sum_{nh=1}^{NH} w_{nh} \left( \frac{Hs_{nh}(t) - Ho_{nh}(t)}{Hpnt} \right)^2 + \sum_{nf=1}^{NF} w_{nf} \left( \frac{Qs_{nf}(t) - Qo_{nf}(t)}{Qpnt} \right)^2}{NH + NQ} \quad (7)$$

2. Objective type II: minimize the sum of absolute differences $$F(\vec{X}) = \sum_{t=1}^{T} \frac{\sum_{nh=1}^{NH} w_{nh} \left| \frac{Hs_{nh}(t) - Ho_{nh}(t)}{Hpnt} \right| + \sum_{nf=1}^{NF} w_{nf} \left| \frac{Qs_{nf}(t) - Qo_{nf}(t)}{Qpnt} \right|}{NH + NQ} \quad (8)$$

3. Objective type III: minimize the maximum absolute difference $$F(\vec{X}) = \underset{t,nh,nf}{\mathrm{argmax}} \left\{ \left| \frac{Hs_{nh}(t) - Ho_{nh}(t)}{Hpnt} \right|, \left| \frac{Qs_{nf}(t) - Qo_{nf}(t)}{Qpnt} \right| \right\} \quad (9)$$

where $Ho_{nh}(t)$ designates the observed hydraulic grade of the nh-th junction at time step t, $Hs_{nh}(t)$ is the model-simulated hydraulic grade of the nh-th junction at time step t, $Qo_{nf}(t)$ is the observed flow of the nf-th link at time step t, $Qs_{nf}(t)$ is the simulated flow of the nf-th link at time step t, Hpnt notes the hydraulic head per fitness point while Qpnt is the flow per fitness point, both are the user-specified coefficients to convert pressure and flow differences into dimensionless values, and also can be applied as weighting factors for pressure and flow calibration, NH is the number of observed hydraulic grades and NQ is the number of observed pipe discharges, $W_{nh}$ and $W_{nf}$ represent the normalized weighting factors for observed hydraulic grades and flows respectively. They are given as:

$$W_{nh} = W(Hloss_{nh}/\Sigma Hloss_{nh}) \quad (10)$$

$$W_{nf} = w(Qo_{nf}/\Sigma Qo_{nf}) \quad (11)$$

where w( ) is a function which can be linear, square, square root, log or constant and $Hloss_{nh}$ is the head loss at observation data point nh. An optimized calibration may be is conducted, for example, by selecting one of these three objectives via the user interface 210 and the weighting factors between junction hydraulic heads and pipe flows.

The optimization problem formulated as Eq. (2) to (11) is an implicit nonlinear search problem. Accordingly, the problem may be solved by the evaluation module 220 and GA-based optimizer 230 as part of a hydraulic simulation model calibration process. The constraints given by Eq. (5) and (6) may ensure the GA effectively searches for "good" solutions of the leakage detection problem. During an optimization, nodal pressure may become negative when too much demand is assigned to a node. It is preferable that a leakage detection solution that includes nodes with negative pressures not be selected for producing the next generation of solutions during a GA optimization. On the other hand, it is desirable not to have duplicated nodes be identified as leakage nodes in one solution. This may be promoted by Eq. (6), which indicates that the identified leakage nodes are unique for one solution.

The leakage detection constraints are implicit nonlinear constraints that may be handled by using a penalty function, for example, a penalty function given as:

$$F_{leak}(\vec{X}) = F(\vec{X}) + f_{penalty} \left[ \left| \sum_{n=1}^{NGroup} \sum_{i=1}^{NLeak^n} \min(0, P_i^n) \right| + \sum_{n=1}^{NGroup} NL_{dup}^n \right] \quad (12)$$

Where $f_{penalty}$ is a penalty factor prescribed as one of the optimization option parameters. For leakage detection solutions that meet both constraints, goodness-of-fit values may be the same as the model calibration objectives given as Eq. (7) to (9). Otherwise, an extra penalty term may be calculated and added to the solution goodness-of-fit given by Eq. (12). It is a fitness penalty that deteriorates the solution optimality and thus reduces the likelihood for an infeasible solution to be selected as a parent individual for creating the next generation of solutions.

A possible leakage solution may be represented as a group of leakage nodes with positive emitter coefficients. The greater the optimized emitter coefficient, the greater the leakage that is predicted. When an emitter coefficient is optimized and reported as zero, it means that leakage is not likely at the associated node. Two variables may be used to represent the solution for each leakage node, namely a first variable representing a node identifier and a second variable representing the node's emitter coefficient. To search for a total number of NLeak nodes, 2NLeak variables may be coded as one GA solution individual. A binary code may be used for encoding the GA solution, where the node identifier is designated as a node index and the emitter coefficient is encoded with a value between zero and the prescribed maximum value based on the specified increment. The solution representation is flexible and effective for applying the method to a large water system. The optimized number of leakage nodes, where the calculated emitter coefficients are greater than zero, should be less than the specified maximum number of possible leakage nodes specified by the user. Otherwise the user may increase the maximum number of possible leakage nodes and rerun the leakage detection procedure.

Figure 4:
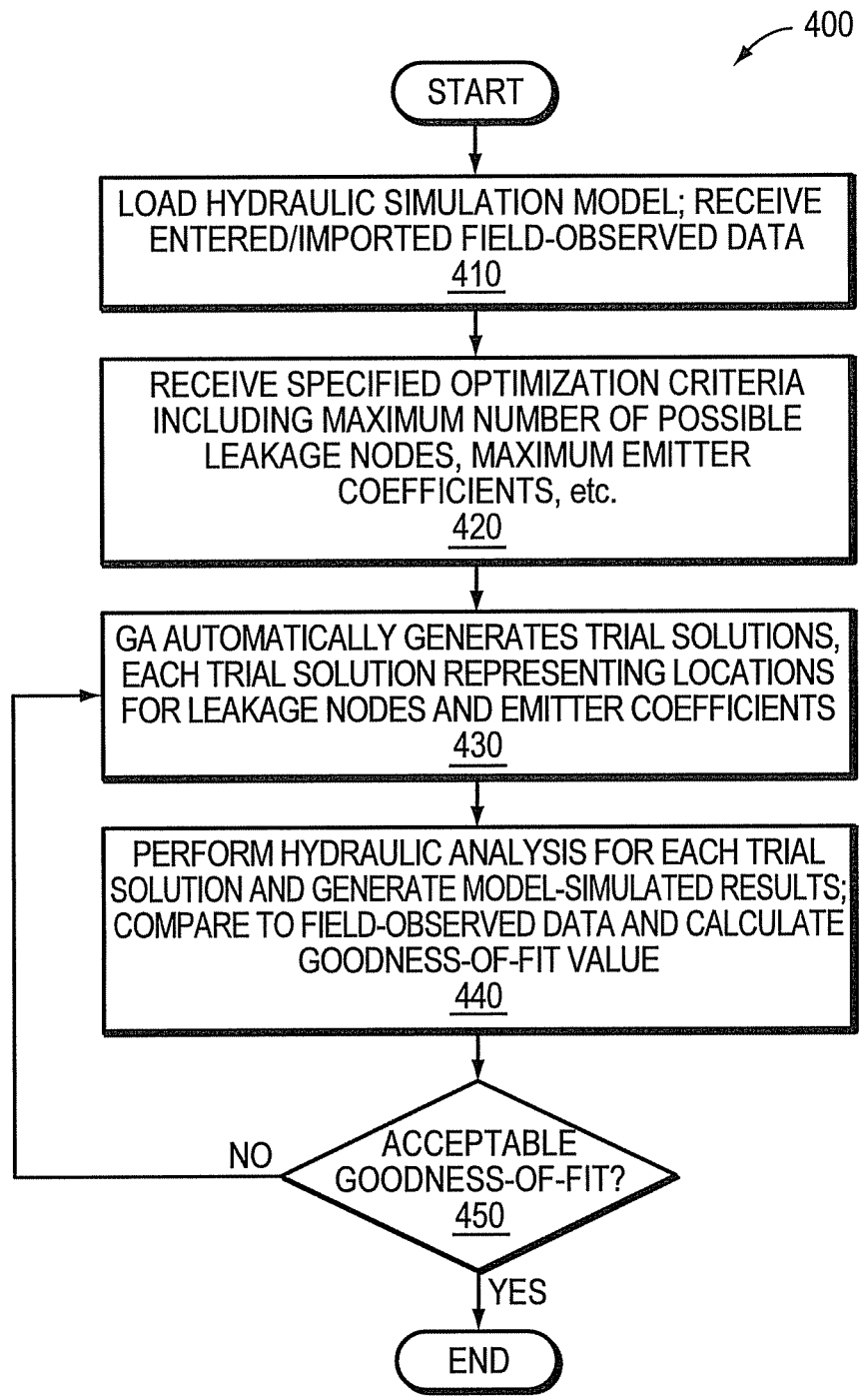
FIG. 4 is an example flow diagram whose sequence of steps summarizes an example procedure for leakage detection.

The above described leakage detection techniques may be better understood in reference to the example flow diagram FIG. 4 whose sequence of steps 400 summarizes an example procedure for leakage detection. At step 410, a hydraulic simulation model of a real-world water distribution system is loaded and corresponding field-observed data is entered/imported, for example, in response to a user's interaction with the user interface 210. The field-observed data may include datasets collected at different times, with each data set collected at one time corresponding to specific system conditions. A sufficient field-observed dataset may include: target data comprising junction pressures/HGLs and pipe flows; boundary data comprising tank levels, pump status (e.g. on/off) and relative speed, valve settings link status (e.g., open/closed); demand data comprising representative demands for junctions, and demand adjustments; and a data collection time when the field-observed data was recorded At step 420, corresponding optimization criteria are specified, for example, by a user interacting with the user interface 210. The optimization criteria include a maximum number of possible leakage nodes, noted as $NLeak^n$ for each nodal demand group n. A user may limit the maximum number of possible leakage nodes to a reasonable estimated number. Should the user believe the limit is adversely affecting results, the user may perform multiple leakage determination optimizations with different maximum number of possible leakage nodes, and then compare results to see if similar leakage node locations are identified. The optimization criteria may further include maximum emitter coefficients and other parameters.

At step 430, the GA of the GA-based optimizer 230 automatically generates trial solutions which will progressively improve during the optimization process. Each trial solution represents locations for leakage nodes, $NLeak^n$, within a node demand group n, as well as emitter coefficients corresponding to the leakage nodes. The trial solutions, along with the field-observed data, demand loading and boundary conditions, are then submitted to the evaluation module 220.

At step 440, the evaluation module 220 performs a hydraulic analysis with each trail solution and predicts hydraulic responses (i.e. model-simulated results). The model-simulated results are compared to the field-observed data for the corresponding real-world water distribution system, to calculate a goodness-of-fit value. Further a penalty term is generated. A trial solution with better goodness-of-fit is more likely to be selected as a parent solution to produce a new solution for a next generation. As such the sequence of steps evolves solutions (locations for leakage nodes and corresponding emitter coefficients) generation after generation An optimization run is terminated, at decision step 450, when a maximum number of iterations are reached, or a predetermined acceptable goodness-of-fit value is obtained. Otherwise execution may loop to step 420. The solution corresponding to the acceptable goodness-of-fit value (or otherwise best goodness-of-fit value) is selected and then discs played a user, for example, via the user interface 210, such that the user may see the predicted location of leakage nodes and the corresponding emitter coefficients. Alternatively, the solution may be stored in modeling database 250 or other storage location. Basically, the sequence of steps 400 operates to optimize the locations for leakage nodes and the emitter coefficients for a total number of leakage nodes, $$\sum_{n=1}^{Ngroup} NLeak^n,$$

to minimize the difference between the field-observed data and model-simulated values for flows and pressures.

Figure 5:
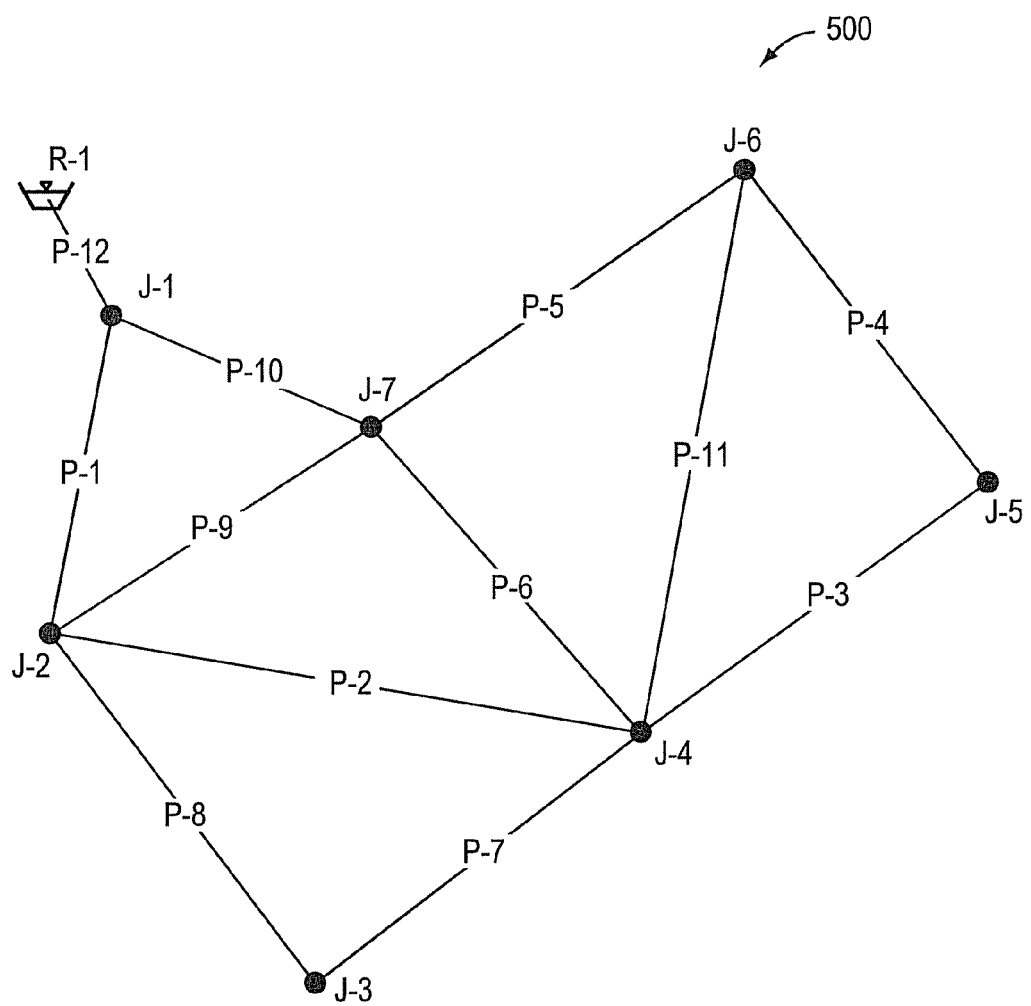
FIG. 5 is a schematic diagram of an example simple water distribution system which may be employed in a test scenario with the leakage detection techniques described herein.

Such technique may be better understood by reference to an example water distribution system and test scenario. FIG. 5 is a schematic diagram of an example simple water distribution system 500, which may be used to demonstrate an application of the above described leakage detection techniques. The node and pipe data for the water distribution system 500 are given in Tables 1 and 2 below.

TABLE 1

| Nodal Data | | |
|---|---|---|
| Node ID | Elevation (m) | Demand (L/s) |
| J-1 | 0.0 | 0.00 |
| J-2 | 0.0 | 0.00 |
| J-4 | 0.0 | 0.00 |
| J-5 | 0.0 | 10.00 |
| J-6 | 0.0 | 10.00 |
| J-7 | 0.0 | 0.00 |
| J-3 | 0.0 | 20.00 |
| R-1 | 40.0 | 0.00 |

TABLE 2

| Pipe Data | | | |
|---|---|---|---|
| Pipe ID | Diameters (mm) | Length (m) | H-W C |
| P-1 | 215 | 1000 | 130 |
| P-2 | 215 | 1000 | 130 |
| P-3 | 215 | 1000 | 130 |
| P-4 | 215 | 1000 | 130 |
| P-5 | 215 | 1000 | 130 |
| P-6 | 215 | 1000 | 130 |

TABLE 2-continued

Pipe Data

| Pipe ID | Diameters (mm) | Length (m) | H-W C |
|---|---|---|---|
| P-7 | 215 | 1000 | 130 |
| P-8 | 215 | 1000 | 130 |
| P-9 | 215 | 1000 | 130 |
| P-10 | 215 | 1000 | 130 |
| P-11 | 215 | 1000 | 130 |
| P-12 | 600 | 100 | 130 |

The leakages are assumed to be lumped and modeled as pressure dependent emitter flows at node J-2, J-4 and J-7 with the emitter coefficient of 0.8 L/s/m$^{0.5}$ and the emitter exponent of 0.5, which results in leakage demand of about 5.5 lps according to Eq. (1). In one example test, a hydraulic simulation model run is performed for the assumed leakage at node J-2, J-4 and J-7 with Hazen-William C value of 130 for all pipes. The simulated pressures at node J-3, J-5 and J-6 along with the flow of pipe P-12 as listed in Table 3, below, are taken as field-observed data to detect the three known leaks at node J-2, J-4 and J-7. In this example, seven optimization runs are undertaken with the different artificial field data combinations of pressures and the system inflow, including one run using the pressures at three nodes (J-3, J-5 and J-6), three runs using the pressures at two of three nodes and three runs using one pressure at each of three nodes respectively.

TABLE 3

Field-Observed Data

| Elements | Attributes | Values |
|---|---|---|
| P-12 | Discharge (L/s) | 54.58 |
| J-6 | Hydraulic Grade (m) | 36.50 |
| J-5 | Hydraulic Grade (m) | 36.40 |
| J-3 | Hydraulic Grade (m) | 36.32 |

The optimized emitter coefficients for this example testing scenario are given in Table 4 shown below.

TABLE 4

Results of Leakage Detection Optimization Using Perfect Pipe Roughness

| Observed Pressures | Solution No. | Optimized Leakage Emitter Coefficients (L/s/m$^{0.5}$) | | | | | | |
|---|---|---|---|---|---|---|---|---|
| | | J-3 | J-4 | J-2 | J-7 | J-1 | J-5 | J-6 |
| J-3 J-5 J-6 | 1 | 0.0 | 0.7 | 1.0 | 0.6 | 0.0 | 0.0 | 0.1 |
| | 2 | 0.0 | 0.5 | 1.0 | 0.7 | 0.0 | 0.0 | 0.2 |
| | 3 | 0.0 | 0.5 | 1.0 | 0.7 | 0.0 | 0.0 | 0.2 |
| J-5 J-6 | 1 | 0.0 | 0.0 | 1.0 | 0.9 | 0.0 | 0.2 | 0.3 |
| | 2 | 0.0 | 0.0 | 1.0 | 0.9 | 0.0 | 0.3 | 0.2 |
| | 3 | 0.9 | 0.0 | 0.3 | 1.0 | 0.0 | 0.2 | 0.0 |
| J-3 J-6 | 1 | 0.0 | 0.8 | 0.6 | 1.0 | 0.0 | 0.0 | 0.0 |
| | 2 | 0.0 | 0.8 | 1.0 | 0.6 | 0.0 | 0.0 | 0.0 |
| | 3 | 0.0 | 0.9 | 0.5 | 1.0 | 0.0 | 0.0 | 0.0 |
| J-3 J-5 | 1 | 0.0 | 0.8 | 0.6 | 1.0 | 0.0 | 0.0 | 0.0 |
| | 2 | 0.0 | 0.0 | 1.0 | 0.8 | 0.0 | 0.0 | 0.6 |
| | 3 | 0.0 | 1.0 | 1.0 | 0.4 | 0.0 | 0.0 | 0.0 |
| J-3 | 1 | 0.1 | 0.3 | 0.8 | 1.0 | 0.0 | 0.2 | 0.0 |
| | 2 | 0.1 | 0.3 | 1.0 | 0.8 | 0.0 | 0.2 | 0.0 |
| | 3 | 0.1 | 0.3 | 0.8 | 1.0 | 0.0 | 0.2 | 0.0 |
| J-5 | 1 | 0 | 0.4 | 0.8 | 1.0 | 0.0 | 0.2 | 0.0 |
| | 2 | 0.8 | 0.0 | 1.0 | 0.4 | 0.0 | 0.2 | 0.0 |
| | 3 | 0.8 | 0.0 | 0.8 | 0.6 | 0.0 | 0.2 | 0.0 |
| J-6 | 1 | 0.0 | 0.0 | 1.0 | 0.8 | 0.0 | 0.6 | 0.0 |
| | 2 | 0.0 | 0.0 | 1.0 | 0.8 | 0.0 | 0.6 | 0.0 |
| | 3 | 0.0 | 0.0 | 1.0 | 0.8 | 0.0 | 0.6 | 0.0 |

Figure 6:
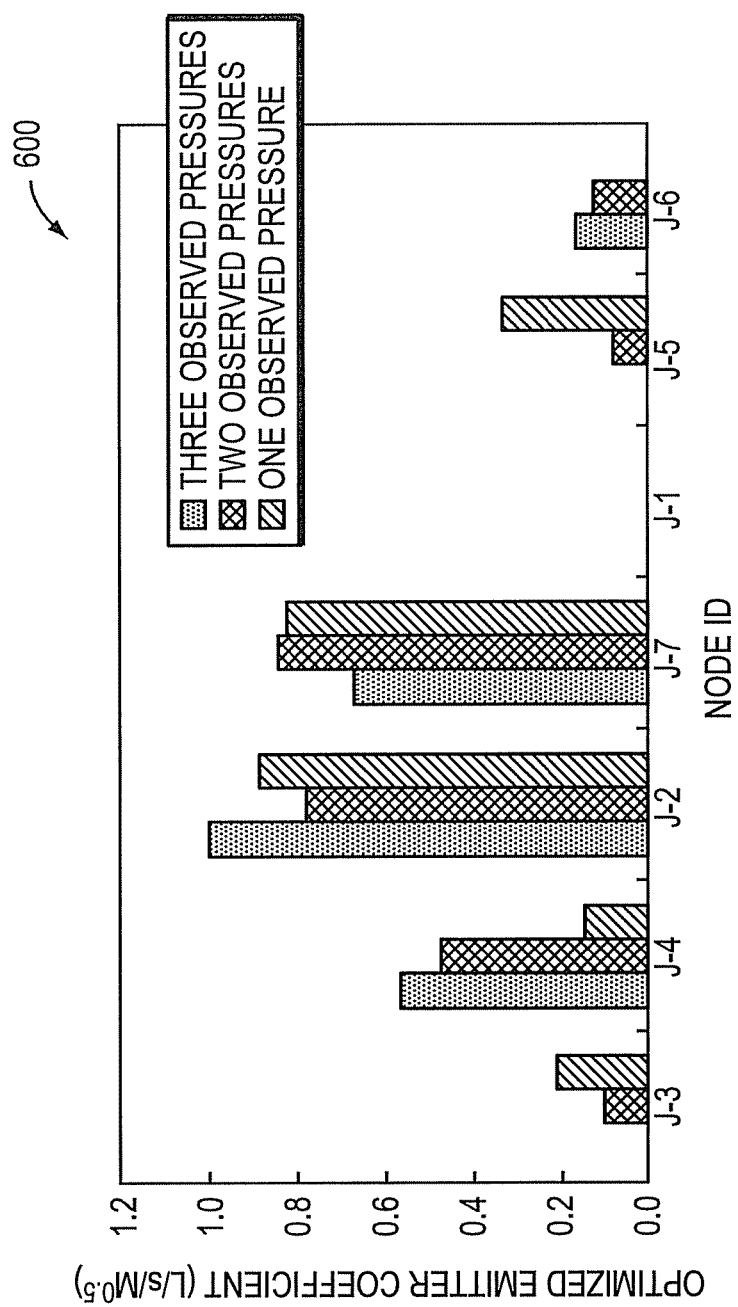
FIG. 6 is an example graph that shows results of a test scenario run on the example simple water distribution system of FIG. 5 and illustrates the average of the optimized emitter coefficients using a number of observed pressures and perfect pipe roughness.

Further, FIG. 6 is an example graph 600 that shows results of the test scenario run on the example simple water distribution system of FIG. 5 and illustrates the average of the optimized emitter coefficients using a number of observed pressures and perfect pipe roughness. As shown in Table 4 and FIG. 6, the three nodes J-2, J-4 and J-7 are identified as leakage nodes by the optimization run using three observed pressures at node J-3, J-5 and J-6. When using two observed pressures, the number of the unknown is greater than the number of the known and the problem becomes under determined. However, the results obtained from most of the optimized leakage detection runs indicate that fairly high leakages occur at the node J-2, J-4 and J-7, and occasionally at J-3, J-5 and J-6. With one observed pressure, the results are less definitive than two and three observed pressures. However, nodes J-2 and J-7 are still consistently identified as leakage nodes. As can be seen, likely leakage nodes may be identified by the solution technique even given a deficiency in some data.

While the above description discusses various embodiments, it should be apparent that a number of modifications and/or additions may be made without departing from the disclosure's intended spirit and scope.

For example, while the above description focuses on modeling and simulating drinking water distribution systems, it should be apparent that underlying techniques may be applicable to a wider variety of other types of hydraulic network, including modeling and simulation other types water networks, for example, waste-water collection systems, as well as networks that may convey fluids other than water.

Further, the above described techniques may be implemented in software, in hardware, or in a combination thereof. A software implementation may include executable instructions stored on a computer-readable storage medium, for example a compact disk (CD), a digital versatile disk (DVD), a hard-disk, a solid-state storage device, a volatile storage device, or other tangible storage medium. A hardware implementation may include processors, memories, programmable logic circuits, application specific integrated circuits, and/or other types of hardware components. Further, a combined software/hardware implementation may include both executable instructions embodied in a computer-readable medium, as well as one or more hardware components.

Accordingly, it should be understood that the above descriptions are meant to be taken only by way of example.

What is claimed is:

1. A method for leakage detection in a hydraulic network comprising loading a hydraulic simulation model corresponding to a real-world hydraulic network in a hydraulic modeling and simulation application executing on a computer system, the hydraulic simulation model configured to represent leakages as pressure dependent emitter flow at selected nodes identified as leakage nodes;

receiving optimization criteria including a specified maximum of possible leakage nodes;

generating, by a genetic algorithm (GA), a plurality of trial solutions for an optimization, each trial solution representing locations for leakage nodes and corresponding emitter coefficients;

performing a hydraulic analysis for the trial solutions to generate model-simulated results;

comparing the model-simulated results to field-observed data for the real-world hydraulic network and generating goodness-of-fit values, each goodness-of-fit value based on a combination of a calculated head difference between model-simulated hydraulic grade and field-observed hydraulic grade and a calculated flow difference between model-simulated flow and field-observed flow;

repeating the generating, performing and comparing to attempt to minimize the head difference and the flow difference, until a particular goodness-of-fit value is achieved or a maximum number of iterations is reached; and displaying, in a user interface of the computer system, predicted locations for leakage nodes from a particular selected trial solution.

2. The method of claim 1, wherein the hydraulic network is a water distribution system.

3. The method of claim 1, wherein the specified maximum of possible leakage nodes is specified by a user interacting with the user interface of the computer system.

4. The method of claim 1, wherein optimization criteria further comprise maximum emitter coefficients allowed for nodes.

5. The method of claim 1 wherein the displaying also displays emitter coefficients corresponding to the leakage nodes, a larger emitter coefficient indicating more leakage at a node.

6. The method of claim 1, wherein the steps of generating, performing, comparing, and repeating collectively operate to search for $$\vec{X} = (LN_i^n K_i^n);\ LN_i^n \in J^n;\ n=1, \ldots, NGroup;\ i=1, \ldots, NLeak^n$$

that minimizes $$F(\vec{X})$$

subject to $$0 \leq K_i^n \leq \overline{K^n}$$
$$P_i^n > 0$$
$$\sum_{n=1}^{NGroup} NL_{dup}^n = 0$$

where $LN_i^n$ is a leakage node index for leakage node i within a demand group n, $K_i^n$ is an emitter coefficient for leakage node i in group n, $J^n$ is a set of nodes within node group n, NGroup is a number of node groups, $NLeak^n$ is a number of specified leakage nodes to be identified for node group n, $\overline{K^n}$ is a maximum emitter coefficient for group n, $P_i^n$ is a pressure head at detected leakage node i within group n, $NL_{dup}^n$ is a number of duplicated nodes that are identified as leakage emitters in one solution for group n, and $F(\vec{X})$ is an objective function that evaluates goodness-of-fit.

7. The method of claim 6, wherein $F(\vec{X})$ operates to minimize a sum of difference squares, minimize a sum of absolute differences or minimize a maximum absolute difference.

8. An apparatus for leakage detection in a hydraulic network, comprising:

a processor; and a memory configured to store computer-executable instructions for execution on the processor, the computer-executable instructions implementing, a hydraulic simulation model corresponding to a real-world hydraulic network, the hydraulic simulation model configured to represent leakages as pressure dependent emitter flow at selected nodes identified as leakage nodes, a user interface configured to receive optimization criteria including a specified maximum of possible leakage nodes, a genetic algorithm (GA)-based optimizer configured to generate a plurality of trial solutions for an optimization, each trial solution representing locations for leakage nodes and corresponding emitter coefficients, and an evaluation module configured to perform a hydraulic analysis for the trial solutions to generate model-simulated results, and compare the model-simulated results to field-observed data for the real-world hydraulic network and generate goodness-of-fit values, each goodness-of-fit value based on a combination of a calculated head difference between model-simulated hydraulic grade and field-observed hydraulic grade and a calculated flow difference between model-simulated flow and field-observed flow, and in response to one or more of the goodness-of-fit values, to select a particular trial solution as a solution.

9. The apparatus of claim 8, wherein the user interface is further configured to display predicted locations for leakage nodes from the particular selected trial solution.

10. The apparatus of claim 9, wherein the user interface is further configured to display emitter coefficients corresponding to the leakage nodes of the particular selected trial solution, a larger emitter coefficient indicating more leakage at a node.

11. The apparatus of claim 8, wherein the hydraulic network is a water distribution system.

12. The apparatus of claim 8, wherein the user interface is configured to receive from a user the specified maximum of possible leakage nodes.

13. The apparatus of claim 8, wherein the optimization criteria further comprise maximum emitter coefficients allowed for nodes.

14. A non-transitory computer-readable storage medium including instructions executable by a processor, the instructions when executed by the processor to:

load a hydraulic simulation model corresponding to a real-world hydraulic network in a hydraulic modeling and simulation application executing on a computer system, the hydraulic simulation model configured to represent leakages as pressure dependent emitter flow at selected nodes identified as leakage nodes;

receive optimization criteria;

generate, by a genetic algorithm (GA), a plurality of trial solutions for an optimization, each trial solution representing locations for leakage nodes and corresponding emitter coefficients;

perform a hydraulic analysis for the trial solutions to generate model-simulated results;

compare the model-simulated results to other data and generate goodness-of-fit values based on a combination of a calculated head difference and a calculated flow difference between model-simulated results and the field-observed data;

repeat the instructions to generate, perform, and compare to attempt to minimize the head difference and the flow difference, until a particular goodness-of-fit value is achieved or a maximum number of iterations is reached; and display predicted locations for leakage nodes from a particular selected trial solution.

15. The non-transitory computer-readable storage medium of claim 14, wherein the hydraulic network is a water distribution system.

16. The non-transitory computer-readable storage medium of claim 14, wherein the optimization criteria comprise a specified maximum of possible leakage nodes.

17. The non-transitory computer-readable storage medium of claim 16, wherein the optimization criteria further comprise maximum emitter coefficients allowed for nodes.

* * * * *

UNITED STATES PATENT AND TRADEMARK OFFICE
CERTIFICATE OF CORRECTION

PATENT NO. : 8,635,051 B1  
APPLICATION NO. : 12/550214  
DATED : January 21, 2014  
INVENTOR(S) : Zheng Yi Wu et al.

Page 1 of 1

It is certified that error appears in the above-identified patent and that said Letters Patent is hereby corrected as shown below:

In the Specification:

Col. 1, line 59 should read:  
~~(MNF) (e.g. 1:00 AM to 5:00 AM) is to avoid supply inter-~~  
(MNF) (e.g. 1:00 AM to 5:00 AM) to avoid supply inter- Col. 4, line 14 should read:  
~~coupled to a is display 175, may be connected to the I/O bus~~  
coupled to a display 175, may be connected to the I/O bus Col. 5, line 25 should read:  
~~model-simulated values. As discussed in is more detail below,~~  
model-simulated values. As discussed in more detail below, Col. 5, line 66 should read:  
~~implement novel model-based pressure-dependant is demand~~  
implement novel model-based pressure-dependant demand Col. 6, line 42 should read:  
~~cal all-mains hydraulic simulation model of a realis world~~  
cal all-mains hydraulic simulation model of a real world Col. 8, line 39 should read:  
~~tion data point nh. An optimized calibration may be is con-~~  
tion data point nh. An optimized calibration may be con- Col. 10, lines 19/20 should read:  
~~wise best goodness-of-fit value) is selected and then discs played a user, for example, via the user interface 210, such~~  
wise best goodness-of-fit value) is selected and then displayed a user, for example, via the user interface 210, such Signed and Sealed this  
Twenty-seventh Day of May, 2014

Michelle K. Lee  
*Deputy Director of the United States Patent and Trademark Office*